United States Patent [19]

Malone

[11] Patent Number: 5,443,581
[45] Date of Patent: Aug. 22, 1995

[54] CLAMP ASSEMBLY FOR CLAMP HUB CONNECTORS AND A METHOD OF INSTALLING THE SAME

[75] Inventor: Tommy W. Malone, Houston, Tex.

[73] Assignee: Wood George & Co., Inc., Houston, Tex.

[21] Appl. No.: 984,696

[22] Filed: Dec. 3, 1992

[51] Int. Cl.⁶ .................. F16L 23/00; F16L 23/04
[52] U.S. Cl. .................. 285/364; 285/336; 285/365
[58] Field of Search .......... 285/364, 365, 406, 407, 285/336, 334.1; 29/890.14, 468, 464, 451

[56] References Cited

U.S. PATENT DOCUMENTS

| 180,781 | 8/1876 | Morgan | 285/406 |
| 647,468 | 4/1900 | Brown et al. | 29/890.14 |
| 4,063,758 | 12/1977 | Westberg | 285/364 |
| 4,146,261 | 3/1979 | Edmaier et al. | 285/364 |

FOREIGN PATENT DOCUMENTS

| 2819921 | 11/1979 | Germany | 285/365 |
| 3741782 | 6/1989 | Germany | 285/365 |
| 1288680 | 9/1972 | United Kingdom . | |
| 1504914 | 3/1978 | United Kingdom . | |
| 1531998 | 11/1978 | United Kingdom . | |
| 2243659 | 11/1991 | United Kingdom . | |
| 9319312 | 9/1993 | WIPO . | |

OTHER PUBLICATIONS 1962-63 Composite Catalog, p. 2102.
1968-69 Composite Catalog, pp. 1055-1057.
Spec 16A: Specification for Drill Through Equipment for API Type 16B Integral Hub Connections for 2,000 and 3,000 PSI Rated Working Pressure, pp. 26-29 (No Date).
Woodco USA Inc. catalog (Jul. 1989).
Ingram Cactus Plexus Products/Canada Works, p. 38 (No Date).
FMC Speedloc Segmented Clamps, FMC 1992, pp. 1-6.

Primary Examiner—P. Austin Bradley
Assistant Examiner—Jeffrey T. Knapp
Attorney, Agent, or Firm—Vaden, Eickenroht, Thompson & Feather

[57] ABSTRACT

A clamp assembly is for connecting the two hubs of a hub connector with each hub in sealing engagement with a seal ring, the hubs having flat opposing surfaces with ring grooves and tapered annular surfaces on the opposite side of the hubs from the ring grooves. The clamp assembly includes a flat sided, adapter ring for positioning between the opposing faces of the hubs, the adapter having a ring groove on each side for engaging seal rings located in the ring grooves in the faces of the hubs, a plurality of tapped holes in the outside wall of the adapter ring, a plurality of clamp segments positioned around the adapter ring, studs connected to the tapped holes in the adapter ring and extending through openings in the clamp segments and nuts on the studs outside the clamp segments for moving the clamp segments toward the hubs to cause the inclined surfaces on the clamp segments to force the hubs into sealing engagement with the seal rings.

2 Claims, 2 Drawing Sheets

CLAMP ASSEMBLY FOR CLAMP HUB CONNECTORS AND A METHOD OF INSTALLING THE SAME

This invention relates generally to clamp hub connectors for fluid conduits and in particular to the clamp assembly for holding the two hubs of the connector in sealing engagement with seal rings and to a method of installing the clamp assembly.

Clamp hub connectors include hubs on the ends of the two tubular fluid conduits to be connected. Each hub has a flat face with a seal ring groove in the face. The opposite side of each hub has an inclined annular surface. These surfaces mate with inclined annular surfaces on a clamp that can force the faces of the two hubs axially into engagement and, at the same time, move the seal ring grooves in each face into sealing engagement with a ring seal. Bringing the faces of the two hubs into engagement gives the connection structural stability, specifically the ability to resist lateral forces imposed on one of the members connected together. This is an important feature of this type connection. Clamp hub connections provide an alternative to the well-known bolted flange connection.

Two-piece bolted clamps are presently used to connect the hubs in the manner described above. When connecting wellhead assemblies and other components, such as blowout preventers and Christmas trees, these clamps become large, heavy, and difficult to install, requiring special handling devices, extra manpower, and up to three hours for installation. During makeup, large clamps often have to be forced into position with a sledge hammer as the studs or bolts are tightened in order to achieve uniform clamp loading. Once in position, the conventional clamp is still difficult to fully make up because the bolts must be tightened to very high torques. Recently FMC Corporation in an effort to solve these difficult handling problems with the clamp portion of the connection has come out with its SPEEDLOC TM segmented clamp. These clamps, however, require at least one specially designed hub upon which the clamp segments are mounted. Therefore, this clamp cannot be used to connect two conventional hubs.

It is an object and feature of this invention to provide a clamp assembly that can be used to connect conventional connector hubs and that can be quickly and easily installed to connect blowout preventers, wellhead assemblies, and other drill-through components.

It is a further object and feature of this invention to provide a clamp assembly for connecting the two hubs of a hub connector that includes a flat-sided, adapter ring for positioning between the opposing faces of the hubs, the adapter having a ring groove on each side for engaging seal rings located in the ring grooves of the hubs, a plurality of tapped holes on the outside wall of the adapter, a plurality of clamp segments positioned around the annular adapter, threaded means mounting the clamp segments to the adapter, tapered surfaces on each clamp segment for engaging the converging tapered surfaces on the hubs, and threaded means for engaging the tapped holes in the adapter to move the clamp segments toward the hubs and cause the inclined surfaces on the clamp segments to force the hubs into sealing engagement with the seal rings.

It is a further object and feature of this invention to provide such a clamp assembly in which the means for moving the clamp segments toward the hubs comprise tapped openings in the side of the adapter ring, openings through the clamp segments, studs threaded on both ends extending through the openings in the segments and connected to the adapter ring by mating threads on the studs and in the tapped holes, and nuts on the outer threaded ends of the studs for moving the segments toward the hubs on the nuts as the nuts are rotated.

It is a further object and advantage of this invention to provide an improved method of connecting the two hubs of a hub connection along a vertical axis in view of the particular problem that is associated with connecting stacks of blowout preventers and the like, in which the method includes the steps of placing a seal ring in the ring groove of the hub that is looking up, connecting a plurality of clamp segments around the outside of an adapter ring having top and bottom flat sides provided with ring grooves, lowering the adapter ring onto the seal ring in the ring groove of the hub looking up, placing a seal ring in the ring groove in the top side of the adapter ring, lowering the hub looking down to move the ring groove in the hub into engagement with the seal ring in the groove in the top side of the adapter ring, and moving the clamp segments laterally into engagement with the hubs to pull the hubs and adapter into sealing engagement with the seal rings and to clamp the hubs together.

It is a further object of this invention to provide such a method in which the steps of connecting the clamp segments to the adapter ring before the adapter ring is lowered onto the seal ring in the ring groove of the hub looking up include the steps of supporting the adapter ring by two or more clamp segments as it is lowered into position on the hub looking up.

It is a further object and feature of this invention to provide such a method that includes the steps of covering the opening through the adapter ring as it is lowered on to the hub looking up and removing the cover as the hub looking down is lowered into position to prevent foreign objects, such as hand tools and the like from being inadvertently dropped into the well bore through the opening in the hubs until just before the top hub is lowered into engagement with the bottom hub.

These and other objects, advantages, and features of this invention will be apparent to those skilled in the art from a consideration of this specification, including the attached drawings and appended claims.

IN THE DRAWINGS

Figure 3:
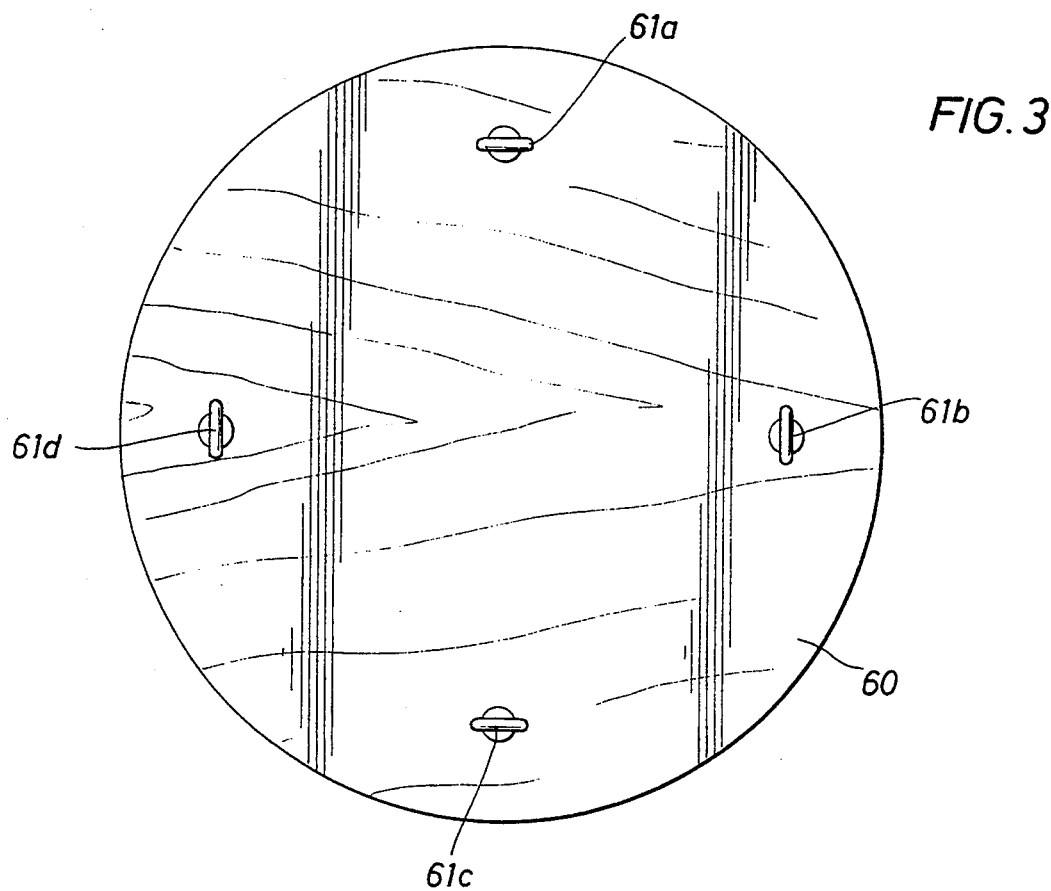
FIG. 3 is a top view of a disc for bracing the clamp assembly of this invention for shipment and for supporting the clamp assembly as it is moved into position on top of the hub looking up, as shown in FIG. 4, with the clamps spread apart far enough to clear the flange on the hub which would be the case when using the assembly to connect blowout preventers in a vertical stack.
Figure 4:
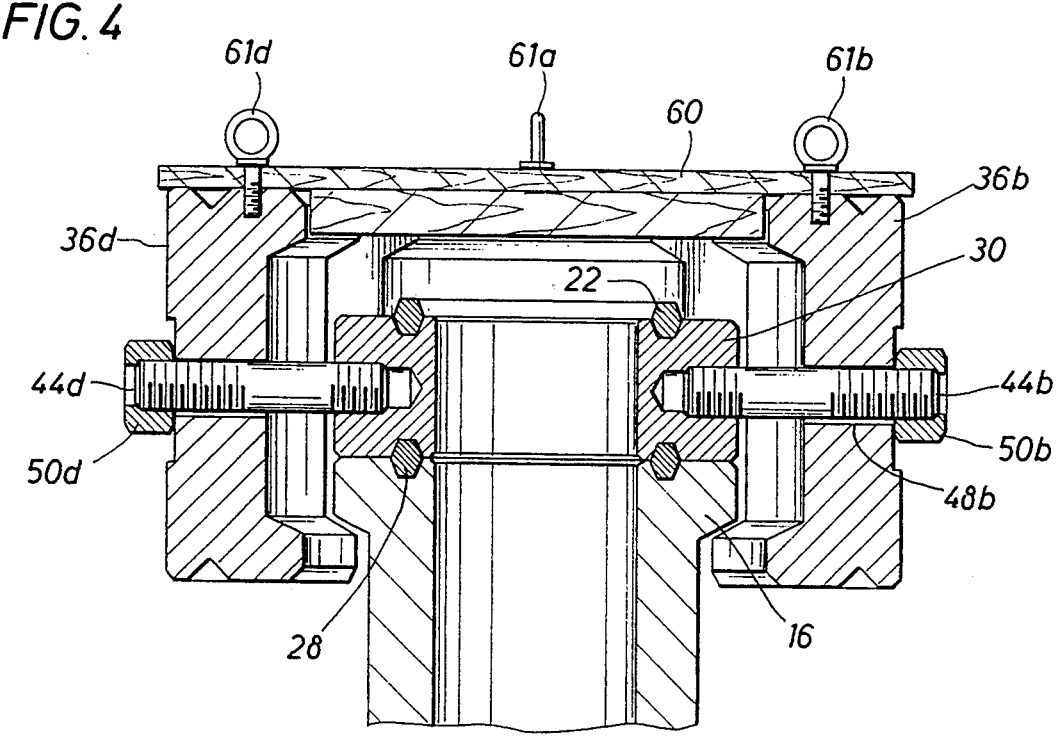

FIG. 4 shows the hub assembly and the supporting disc of FIG. 3 with the disc supporting the clamp segments that in turn support the adapter ring in position on the hub looking up with the disc closing the opening through the clamp segments and the opening through the adapter ring to prevent foreign objects from being inadvertently dropped through the opening while the clamp assembly is being moved into position.

Figure 1:
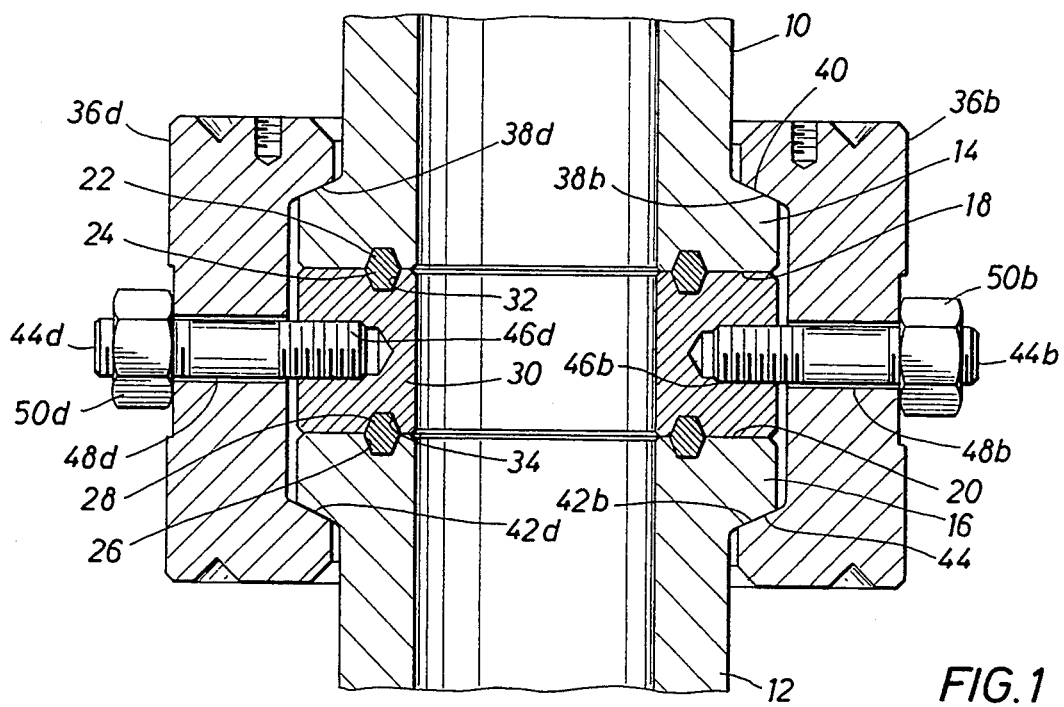
FIG. 1 is a vertical sectional view through a hub connection assembled with the clamp assembly of this invention.
Figure 2:
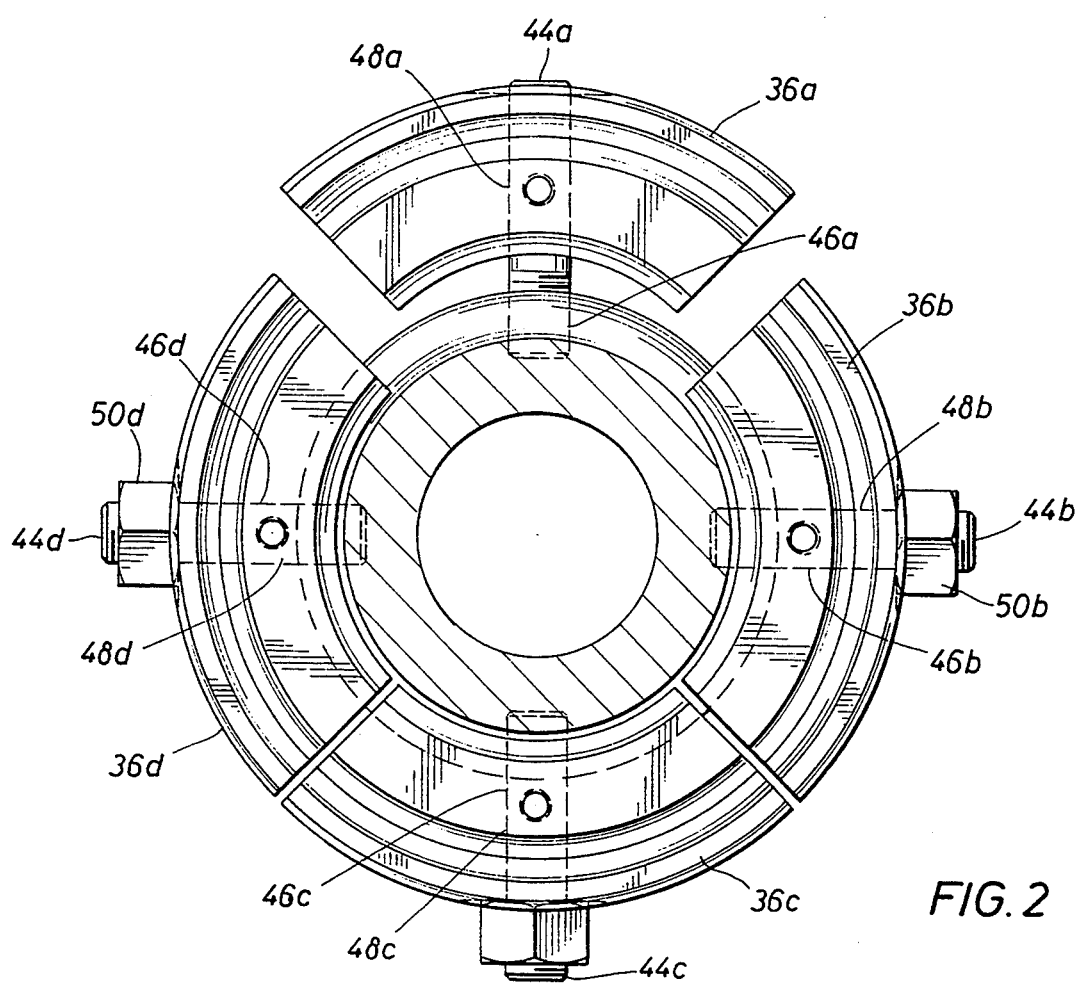
FIG. 2 is a top view of the hub connection of FIG. 1 with one clamp segment being moved laterally out of engagement with the adapter ring.

In FIG. 1, fluid conduits 10 and 12 are connected in axial alignment by the hub connector shown. In a typical use of the connector, conduits 10 and 12 could be connected to two blowout preventers stacked one on top of the other below the floor of a drilling rig. Hubs 14 and 16 are an integral part of the conduits. The hubs are larger in diameter than the conduits and have flat faces 18 and 20. Face 18 has seal ring groove 22 in which seal ring 24 is located. Face 20 has seal ring groove 26 in which seal ring 28 is located. As explained above, heretofore, a split clamp would be used to hold the faces of the hubs in engagement with one seal ring engaging both seal ring groove 22 in face 18 and seal ring groove 26 in face 20.

In accordance with this invention, the clamp assembly for hub connectors of this type includes adapter ring 30 positioned between the faces of hubs 14 and 16 and provided with seal ring grooves 32 and 34 that engage seal rings 24 and 28.

The clamp assembly of this invention also includes a plurality of clamp segments 36a–36d. Each clamp segment is provided with inclined surfaces to engage inclined surfaces on the hubs to force the hubs into sealing engagement with the seal rings and into structural engagement with the surfaces of adapter ring 30. As shown in FIG. 1, clamp segments 36b and 36d have inclined surfaces 38b and 38d that engage annular inclined surface 40 on hub 14 and inclined surfaces 42b and 42d that engage annular inclined surface 44 on hub 16. The clamp segments and the hubs are designed so that when the clamp segments are moved inwardly relative to the hubs, the engaged inclined surfaces will cam or force the faces of the hubs into engagement and into sealing engagement with seal rings 24 and 28.

The clamp assembly includes means for mounting the clamp segments on the outside of the adapter ring and means for moving the clamp segments toward the hubs to cause the inclined surfaces on the clamp segments in engagement with inclined surface on the hubs to move the hubs and adapter ring into sealing engagement with the seal rings. In the embodiment shown, the means for mounting the clamp segments on the outside of the adapter ring and the means for moving the clamps toward the hubs comprises studs 44a–44d. The threads on one end of the studs mate with the threads in tapped holes 46a–46d in the side of the adapter ring. The studs extend through holes 48a–48d in the clamp segments. Nuts 50a–50d engage the threads on the outer end of the studs. The combination of the studs and the nuts mount the clamp segments on the adapter ring and also serve to move the clamp segments toward the hubs to cause the inclined surfaces on the hubs and the clamp segments to force the hubs into sealing engagement with the seal rings.

One of the features of this invention is to provide a novel method of connecting two conduits using a hub connection where the conduits are positioned along a vertical axis, as would be the case when connecting a stack of blowout preventers and related equipment.

In such an arrangement, one hub will be looking up and the other hub will be looking down. In FIGS. 1 and 4, hub 16 is the hub looking up. Clamp segments 36a–36d are spread apart and connected to supporting disc 60 by eye bolts 61a–61d. The eye bolts are connected to a hoist that supports the assembly as it is moved over hub 16 and lowered to the position shown in FIG. 4 with the adapter ring engaging seal ring 28, and the hoist can be released at this time and the adapter ring will support the clamp segments and support disc 60. This will allow the hub that is looking down which in this case is hub 14 to be moved in position and lowered onto seal ring 24. Of course, disc 60 must be removed first but this should be done at the last minute since the disc serves to keep hand tools and the like from being inadvertently dropped into the well through the open end of hub 16 and adapter ring 30.

When hub 14 has been lowered into position on the adapter ring, tightening up nuts 50a–50d will move the segments into engagement with the inclined surfaces on the hubs and pull the hubs into sealing engagement with the seal rings to complete the assembly of the connection.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A hub connection comprising two aligned fluid conduits having hubs attached to the ends of the conduits, the hubs having opposite flat faces provided with ring grooves and inclined surfaces facing away from the flat faces, an adapter ring having flat sides with ring grooves in each side located between the faces of the hubs, a seal ring located between each hub face and the adapter and positioned in the opposed ring grooves in the face and the adapter, a plurality of clamp segments positioned around the adapter, each segment having inclined surfaces for engaging the inclined surfaces on the hubs, and means for holding the clamp segments in position to hold the hubs and the adapter ring in sealing engagement with the seal rings.

2. The hub connection of claim 1 in which the means for holding the clamp segments in position to hold the hubs and adapter ring in sealing engagement with the seal rings includes studs located in tapped holes in the side of the adapter ring.

* * * * *